No. 832,485. PATENTED OCT. 2, 1906.
J. G. JONES.
PROCESS OF MAKING LIME.
APPLICATION FILED APR. 24, 1906.
5 SHEETS—SHEET 1.
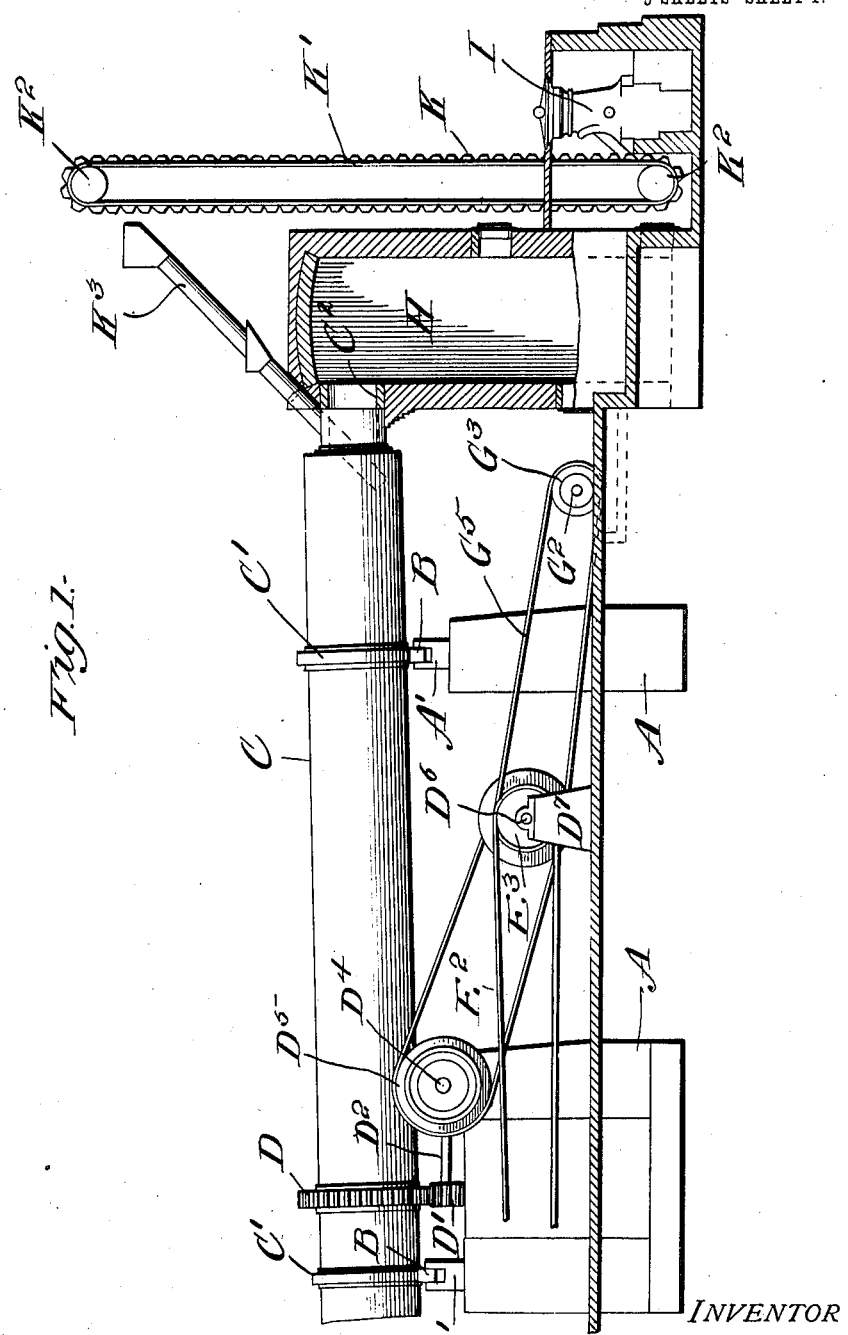
WITNESSES:
INVENTOR
John G. Jones,
By Franklin H. Hough
Attorney No. 832,485. PATENTED OCT. 2, 1906.
J. G. JONES.
PROCESS OF MAKING LIME.
APPLICATION FILED APR. 24, 1906.
5 SHEETS—SHEET 2.
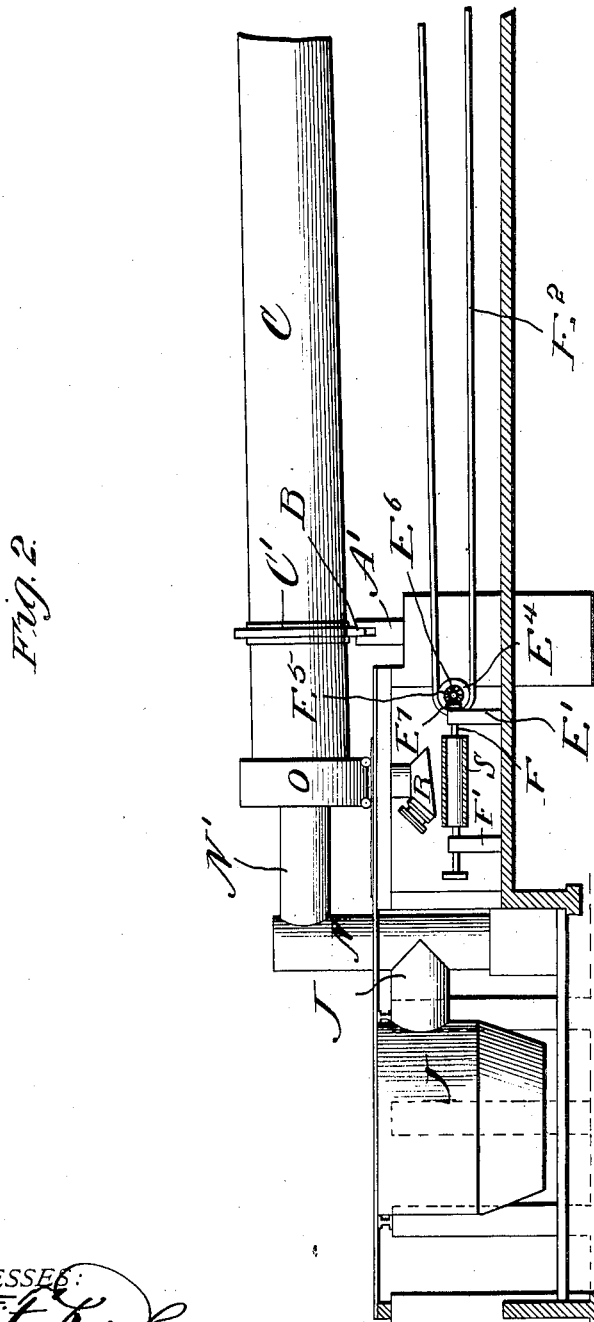

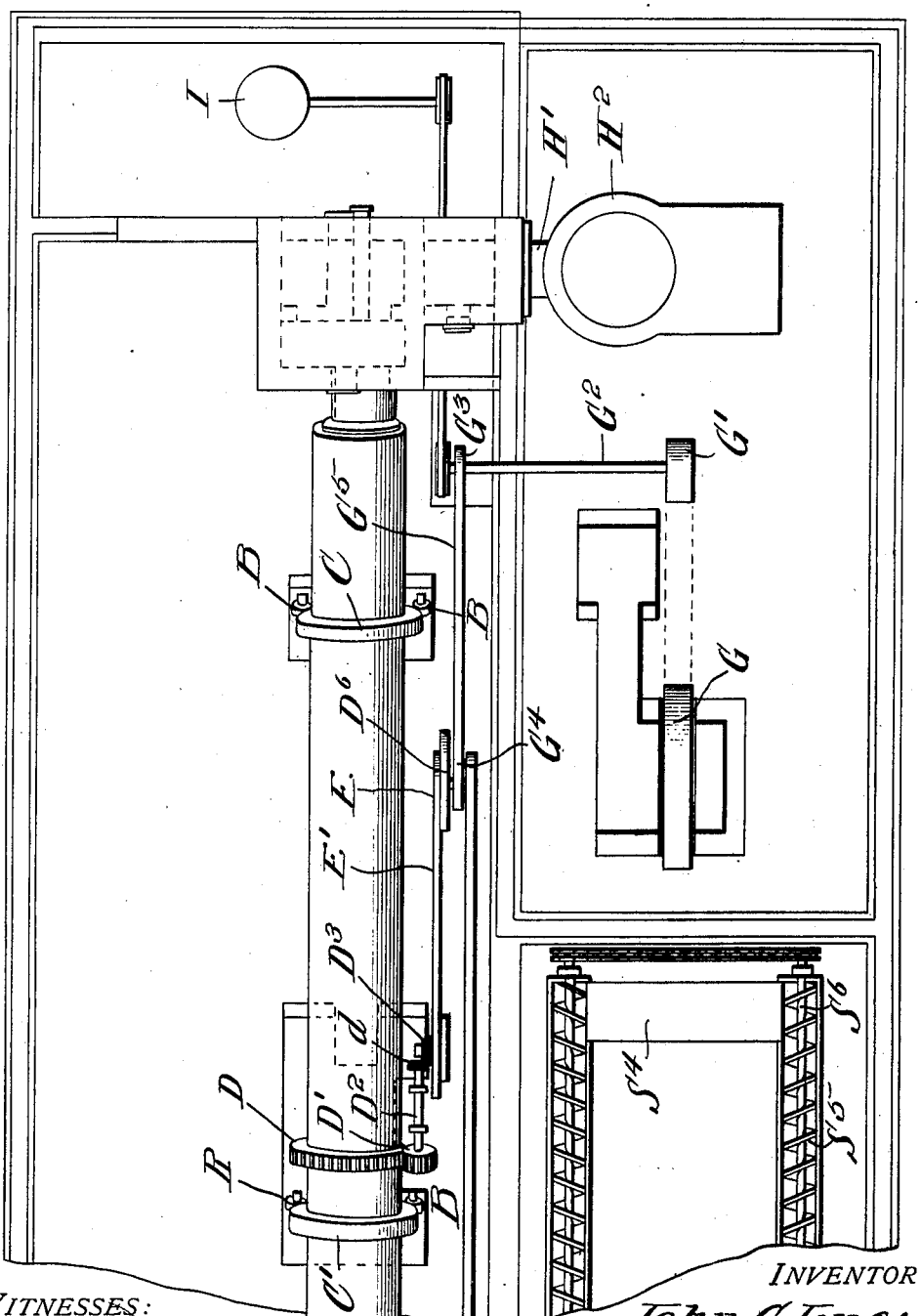

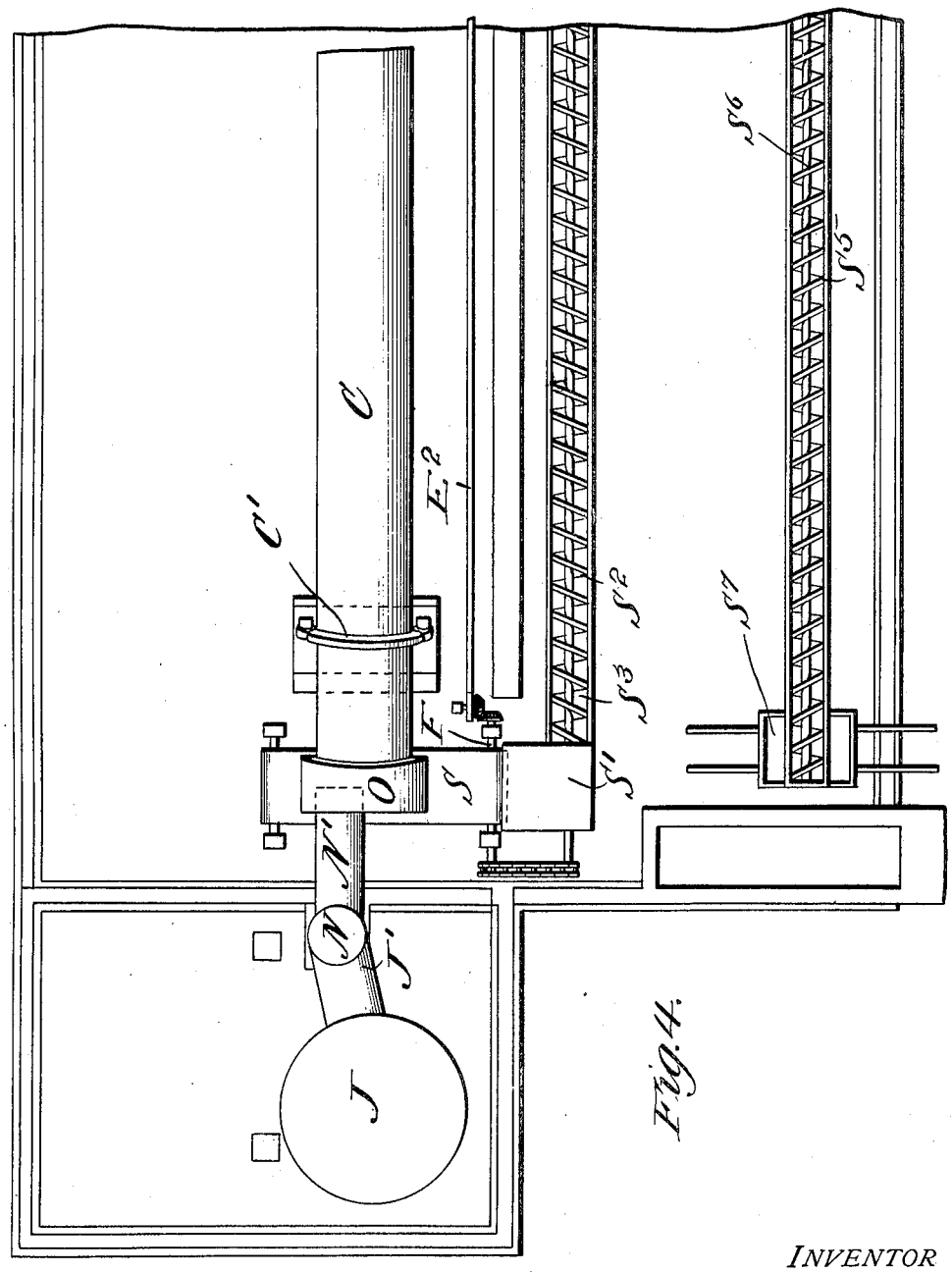

No. 832,485.  
PATENTED OCT. 2, 1906.  
J. G. JONES.  
PROCESS OF MAKING LIME.  
APPLICATION FILED APR. 24, 1906.  
5 SHEETS—SHEET 5.
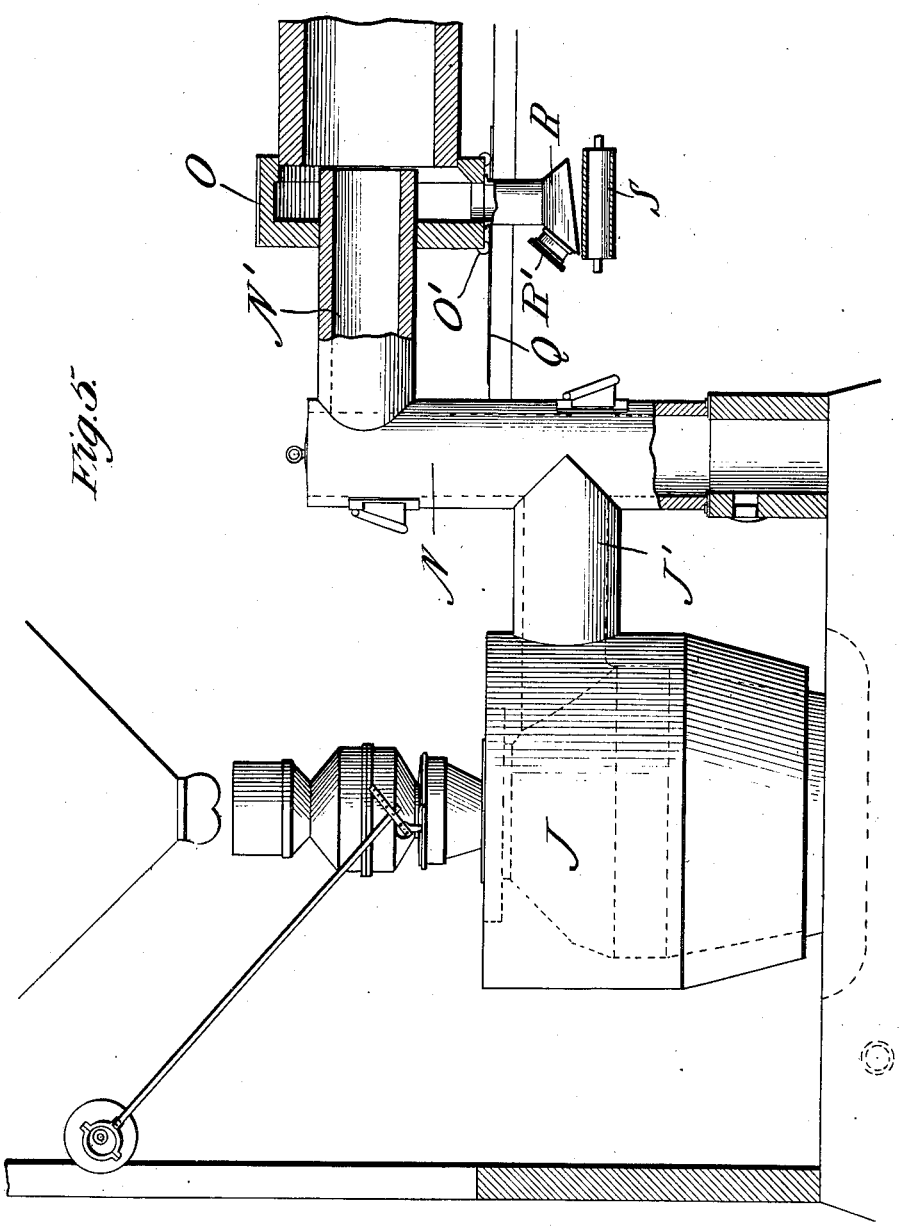
WITNESSES:  
INVENTOR  
John G. Jones.  
BY  
his Attorney

UNITED STATES PATENT OFFICE.

JOHN G. JONES, OF CARTHAGE, NEW YORK.

PROCESS OF MAKING LIME.

No. 832,485.  Specification of Letters Patent.  Patented Oct. 2, 1906.

Application filed April 24, 1906. Serial No. 313,498.

*To all whom it may concern:*

Be it known that I, JOHN G. JONES, a citizen of the United States, residing at Carthage, in the county of Jefferson and State of New York, have invented certain new and useful Improvements in Processes of Making Lime; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a new and useful process in making lime, whereby a superior product may be produced in a granular state and having a slight tendency to air slake owing to the small air-space contained in the bulk.

In the usual method of burning lime stationary kilns are employed in which the limestone in large pieces is placed within the kiln and exposed to a very high degree of temperature for a long period of time in order that the heat may penetrate to the center of the stone and drive off the carbon dioxid, ($CO_2$,) and in so doing the outer portions of the pieces of limestone become very much over-burned, which renders the lime very slow in slaking and dark in color.

In the present invention it is my purpose in carrying out my process to utilize a rotary kiln in which the limestone or other material of a lime nature is fed into the comparatively cool end of the kiln in a granular condition, where the excess of heat introduced into the kiln prepares the lime material for the burning zone, in which the $CO_2$ is driven off and the material reduced to an oxid state. By treating the limestone or other lime material in a granular condition with granules of substantially a size to readily pass through a one-inch-mesh screen a saving of from fifteen to twenty per cent. of the spalls of the quarry is effected, which, in the usual method now employed in stationary kilns is waste material. The utilization of granular pieces of limestone or other lime material of a lime nature in a finely-divided state is fed into the comparatively cool end of the kiln and gradually absorbing the heat as it travels toward the burning end of the kiln drives off moisture and prepares the limestone or other lime material for the burning state, the granular parts of the material not remaining in the burning zone to exceed a period of twenty minutes, whereas in the old style it remained in the burning state for four hours and frequently longer, thereby making a product which is slow to slake and weakened in strength, at the same time discoloring the lime by the uneven burning thereof.

The present invention consists, further, in an improved process of making lime in which producer-gas or other heat-producing material is utilized for taking up the carbon dioxid from the limestone or other material of a lime nature in a granular or finely-divided state and burning the same and the utilization of the waste heat for generating steam for any purpose.

My invention is illustrated in the accompanying drawings, in which—

Figure 1 is a vertical sectional view through a part of an apparatus utilized in carrying out my process, parts of the apparatus being shown in elevation. Fig. 2 is a similar view showing a section of the apparatus in elevation. Fig. 3 is a top plan view of a portion of the apparatus. Fig. 4 is a top plan view of the remaining part of the apparatus which is continuous with the part shown in Fig. 3; and Fig. 5 is an elevation of a gas-producer, showing connections between the same and one end of a rotary kiln, parts being shown in section.

Reference now being had to the details of the drawings by letter, A A designate piers supporting blocks A', which have journaled therein antifriction-rollers B.

C designates a rotary kiln made, preferably, of heavy plate-iron and provided with a suitable lining of fire-brick, and C' designates heavy circular outlined rings which are fixed to the circumference of the kiln and are adapted to ride upon said antifriction-rollers B, thereby affording a supporting means for the kiln.

D designates a series of cog-teeth which are formed in the circumference of a band or ring, which is fixed to the circumference of the rotary kiln, and said cog-teeth are in mesh with a pinion D', which is fixed to a shaft $D^2$, journaled in suitable bearings upon one of said piers, and fixed to rotate with the end of said shaft $D^2$ is a bevel-pinion $d$, which is in mesh with the gear-wheel $D^3$, rotating with a stub-shaft $D^4$, to which is fixed a pulley $D^5$.

$D^6$ designates a shaft which is journaled in suitable bearings upon the standards D⁷, and a pulley E is fixed to the shaft D⁶, and a belt E' passes about the pulleys D⁵ and E. A second band E² passes about a pulley E³, which is also fixed to the stub-shaft D⁶, and said band E² passes about the pulley E⁴, mounted upon a shaft E⁵. (Shown in Fig. 2 of the drawings.) A bevel-gear E⁶ is fixed to the shaft E⁵ and is adapted to communicate motion to the bevel gear-wheel E⁷, which rotates with the shaft F, journaled in suitable bearings in the standards F'. Power is communicated from the driving-wheel G of the engine (shown in Fig. 3 of the drawings) to a pulley-wheel G', rotating with a shaft G², upon which is mounted a pulley-wheel G³, between which and a pulley G⁴, which rotates with the shaft D⁶, is a belted connection G⁵.

Referring to Fig. 1 of the drawings will be seen a chamber (designated in the drawings by letter H) and which comprises a housing of masonry, serving as a dust-chamber. Said chamber has an opening in the side wall thereof near its upper end, in which a shell C² is mounted, said shell being open-ended and having a swivel connection with one end of the rotary kiln. The housing H is utilized as a dust-chamber, in which the products of combustion issuing from the rotary kiln enter and in which the dust is allowed to settle, thus relieving the waste heat thereof preparatory to the heat laden with the carbon dioxid taken up from the lime to a boiler-furnace, where the heat is utilized for making steam. I desinates a stone-crusher in which the limestone is reduced to a granular condition and falling by gravity into the cups K of the endless carrier K', which travels about the pulleys K², is elevated and dumped into the chute K³, which passes through an opening in the circumference of the shell C² and has its exit end positioned within one end of the kiln in the manner clearly shown in Fig. 1 of the drawings. It will be noted from the foregoing that a continuous stream of granulated limestone or other material of a lime nature is being fed from the crusher to the chute and into the kiln. Leading from the dust-chamber H is a pipe H', (shown clearly in Fig. 3 of the drawings,) and said pipe communicates with a boiler H², in which are positioned series of vertical flues and about which flues the waste heat from the kiln circulates for the purpose of heating water within the boiler for producing steam to run the engine.

In the drawings, J designates a gas-producer, which may be of any of the well-known constructions and provided with a pipe J', through which gas passes into the stack N and thence through the laterally-projecting passage-way N' to the adjacent end of the kiln.

O designates a shell having a central aperture adapted to receive the laterally-projecting passage-way N' of the stack and having an opening in one face to receive the adjacent end of the rotary kiln, over which said shell telescopes. Said shell O is mounted upon wheels O', which travel upon tracks Q, supported upon the framework of the apparatus, and depending from the lower end of the shell O is a hood R, having an opening R' in one face thereof, and positioned immediately below said hood is an endless apron or other suitable conveyer S, upon which the burned lime falls from the hopper and by which it may be conveyed to any suitable location and deposited, it being preferable to convey the product a considerable distance, whereby it may have a chance to cool off perceptibly before being deposited in a car or storage-place.

In Figs. 3 and 4 of the drawings I have shown the conveyer S, leading up to a chute S', into which the lime is deposited, and falling into the conveyer-box S² at the lower end of the chute is fed forward therein by the worm S³ and deposited in a chute S⁴, (shown in Fig. 4 of the drawings,) which leads down into a second conveyer-box S⁵, in which is mounted a worm S⁶ for the purpose of advancing the lime in said box to the opposite end thereof, where it may be discharged into a car S⁷. (Shown in Fig. 4 of the drawings.)

In operation the limestone or other material of a lime nature is reduced to a granular condition by the stone-crusher, the granules being preferably of such a size as will conveniently pass through a one-inch-mesh screen and is fed by the endless conveyer K' through the chute and into the rotary kiln, the latter being disposed at a slight inclination and being given a slight rotary movement sufficient to cause the granulated material to be fed forward slowly by the same being raised by the roughened edges of the fire-brick within the kiln and falling back to the lowest portion of the kiln, thus exposing the granules of the limestone or other lime material to the heat as it passes through the kiln and in among the particles of material. An essential feature of my process consists in reducing the granules to such a size as will readily allow the heat to be drawn through the mass of granules in order that the heat may have access uniformly to the entire surfaces of the same, it being detrimental and impossible to reduce the material to a powdered state or even to finely-divided particles, such as will pass through a four to six inch screen, it having been demonstrated by various experiments that material of this condition cannot be successfully burned in a rotary kiln. The intense heat being directed from the gas-producer or other heat-producing apparatus through the kiln and coming in contact with the granulated particles of the material as it is discharged from the kiln, first driving off the $CO_2$ and then the excess of heat, preparing the limestone or other material of a lime nature for the burning zone. As the material in a granular condition advances through the kiln it is gradually absorbing the heat and is being prepared for the burning state, it being understood that the material is subjected to the intense heat in the burning zone for a period not to exceed twenty minutes and after which it falls by gravity at the exit end of the kiln and is carried by the conveyers to any suitable location, where it is discharged at a comparatively cool temperature.

By the utilization of a gas-producer or other heat-producing apparatus I have found that the amount of lime burned may be controlled within very wide limits, the same kiln producing from one to five tons per hour, whereas in the old method of burning lime there is no slowing up, and by my process I am enabled to shut down the kiln and start it up again without any particular loss, as a small amount of heat to keep the kiln warm is conducted through the boiler and making steam and rendering it possible to keep the kiln warm and furnishing as much heat as needed.

The lime produced by my improved process I have found is much whiter than lime which is burned in stationary kilns in large pieces, in which the lime near the surface is overburned and which renders the lime very slow in slaking, and, besides, diminishing the strength thereof. The product of the lime being in a granular condition is less liable to slake in bulk, owing to the small air-spaces contained therein, than would be the case where large pieces of limestone are burned in the usual manner, and by the process described a large proportion of the waste of quarries which cannot be utilized in stationary kilns may be saved.

By the utilization of the heat for driving off the carbon dioxid from the granulated limestone or other material of a lime nature and conducting the heat laden with the carbon-dioxid gas to a boiler, whereby the waste heat is used in developing steam for furnishing power to run the apparatus, the cost of producing the lime is greatly reduced and a large saving in fuel is effected and a product obtained which is superior to lime made by any of the well-known methods.

What I claim is—

1. The process of making lime consisting in reducing the limestone or other material of a lime nature to a granular condition with granules of such a size as will readily pass through a one-inch-mesh screen, introducing the same into the comparatively cool end of an inclined rotary kiln through which heat of a high temperature is passed, thereby gradually raising the temperature of the material before reaching the burning zone in the kiln, as set forth.

2. The process of making lime consisting in reducing the limestone or other material of a lime nature to a granular condition with granules of such a size as will readily pass through a one-inch-mesh screen, introducing the same into the comparatively cool end of an inclined rotary kiln through which heat of a high temperature is passed, whereby the particles of material may gradually absorb heat and drive off moisture, thereby preparing the granulated particles of material for the burning zone of the kiln, in which zone $CO_2$ is driven off and the material reduced to an oxid state, as set forth.

3. The process of making lime consisting in reducing the limestone or other material of a lime nature to a granular condition with granules of such a size as will readily pass through a one-inch-mesh screen, introducing the same into the comparatively cool end of an inclined rotary kiln, introducing producer-gas of a high temperature into the discharge end of the kiln where it first drives off the $CO_2$, reducing the material to an oxid state, and afterward utilizing the excess of heat to prepare the material for the burning zone, as set forth.

4. The process of making lime consisting in reducing the limestone or other material of a lime nature to a granular condition with granules of such a size as will readily pass through a one-inch-mesh screen, introducing the same into the comparatively cool end of an inclined rotary kiln, introducing producer-gas of a high temperature into the discharge end of the kiln where it first drives off the $CO_2$, reducing the material to an oxid state, utilizing the excess of heat to prepare the material for the burning zone, and afterward introducing the waste heat, laden with $CO_2$ gas, into a steam-boiler furnace, as set forth.

5. The process of making lime consisting in reducing the limestone or other material of a lime nature to a granular condition with granules of such a size as will readily pass through a one-inch-mesh screen, introducing the same into the comparatively cool end of an inclined rotary kiln and causing heat of a high temperature to be passed through the kiln as the latter is rotated slowly, thereby causing the granular material to be agitated as it passes slowly through the kiln, the heat first driving off the $CO_2$ and reducing the material to an oxid state, and afterward the excess of heat being utilized to prepare the material for the burning zone in the kiln, as set forth.

6. The process of making lime consisting in reducing the limestone or other material of a lime nature to a granular condition with granules of such a size as will readily pass through a one-inch-mesh screen, introducing the same into the comparatively cool end of an inclined rotary kiln and causing heat of a high temperature to be passed through the kiln as the latter is rotated slowly, thereby causing the granular material to be agitated as it passes slowly through the kiln, the heat first driving off the $CO_2$ and reducing the material to an oxid state, the excess of heat afterward being utilized to prepare the material for the burning zone and for making steam, as set forth.

In testimony whereof I hereunto affix my signature in the presence of two witnesses.

JOHN G. JONES.

Witnesses:
 A. L. Hough,
 Franklin H. Hough.